Dec. 7, 1943. G. OLSON 2,336,030
BAND SAW
Filed April 7, 1943
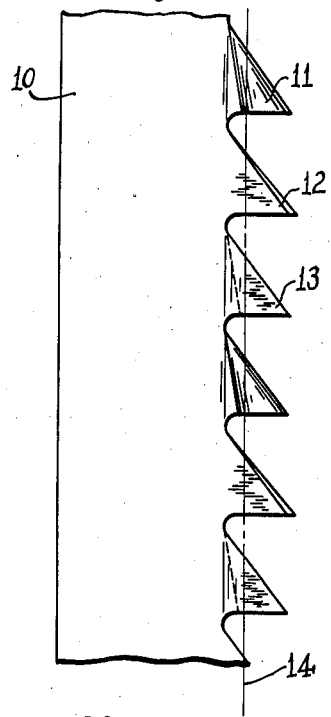
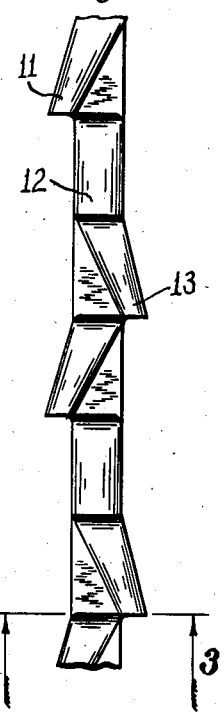
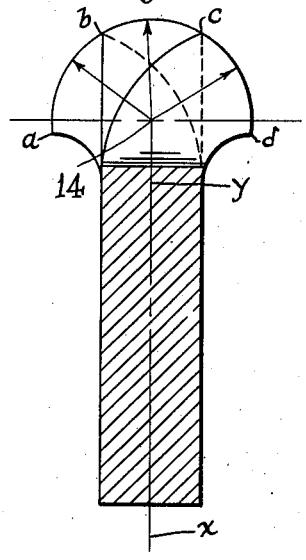
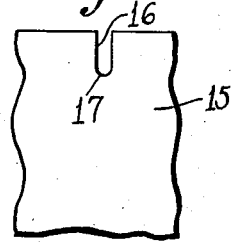
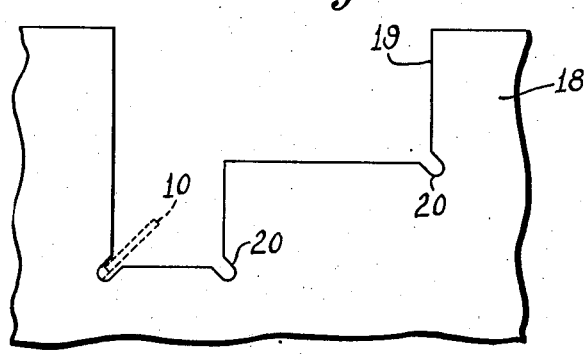
Inventor
Gunnar Olson
By Rockwell Bartholow
Attorneys Patented Dec. 7, 1943

2,336,030

UNITED STATES PATENT OFFICE 2,336,030

BAND SAW

Gunnar Olson, West Hartford, Conn., assignor to Carl Schweizer and Hans Schweizer, copartners doing business as The Hartford Tool & Die Company, Hartford, Conn.

Application April 7, 1943, Serial No. 482,077

9 Claims. (Cl. 29—95)

This invention relates to metal cutting saws and more particularly to band saws designed to be used for this purpose.

It has recently been the practice in tool-making shops where dies and fixtures are made to employ band saws for the cutting of metals. Such saws usually comprise an elongated blade member relatively narrow and thin, having integrally formed teeth projecting therefrom, these teeth being "set" to cut a kerf in metal, leaving clearance for the blade itself. According to usual practice, certain teeth of the saw will be set to one side of the center line or, more properly speaking, the center longitudinal plane of the blade, while others will be set to the other side of this plane, and, in some instances, additional teeth are provided which have no "set" but stand substantially in the plane of the blade itself.

These teeth usually have plane or straight cutting edges so that they will cut a clean rectangular kerf in a block of metal. However, such a kerf is disadvantageous as, where it is employed in connection with dies, for example, or die blocks, and the die or die block is subjected to heat-treating operations, these square corners are apt to cause cracks and thus the completed article will be defective.

It is contemplated by the present invention to provide a metal cutting saw having integrally formed teeth of such a form that the kerf cut thereby will have a smooth rounded bottom surface, generally of arcuate shape in cross section. This rounded bottom surface of the kerf, as distinguished from one of rectangular form with square bottom corners, avoids danger of cracking during subsequent heat-treating operations.

One object of the present invention is the provision of a metal cutting saw having an elongated blade member with teeth projecting therefrom, the teeth having arcuate cutting edges whereby the resulting kerf will be formed with a rounded bottom surface.

A still further object of the invention is the provision of a metal cutting saw comprising a blade member having teeth projecting therefrom, some of which teeth may be set to one side and some to the other, of the center plane of the blade, the teeth having arcuate cutting edges to cut a kerf with a rounded bottom surface.

It is also contemplated that, in addition to the teeth which are given a "set" to one side or the other of the center plane of the blade, additional teeth may be provided which lie substantially in a plane of the blade to cooperate with the other teeth to form a smooth kerf with a rounded bottom.

To these and other ends the invention consists in the novel features and combination of parts to be hereinafter described and claimed.

In the accompanying drawing:

Fig. 1 is a side elevational view of a portion of a band saw embodying my improvements.

Fig. 2 is a front elevational view of the teeth of the saw.

Fig. 3 is a sectional view of line 3—3 of Fig. 2.

Fig. 4 is a view of the block of metal showing the form of the kerf cut by a saw embodying my improvements.

Fig. 5 is a fragmentary view of a die or die block provided with clearance grooves showing one practical application of a saw embodying my improvements.

To illustrate a preferred embodiment of my invention, I have shown in Fig. 1 of the drawing a portion of a band saw comprising a blade member 10 having a plurality of teeth projecting therefrom. As is usual in the case of saws of this character, the teeth are formed integrally with the blade.

As shown more particularly in Fig. 2 of the drawing, the teeth on the saw may be provided in multiples of three. A group of three such teeth comprises one which is set in one direction from the central longitudinal plane passing through the blade, another which is set to the opposite side of the blade, and a third which is given no set and lies substantially in the plane of the blade. For example, the upper tooth 11 shown in Fig. 2 is set to the left of the central plane of the blade which plane is illustrated by the line xy on Fig. 3. The next tooth 12 is given no "set" and lies substantially in the plane of the blade while the next adjacent tooth 13 is given a "set" to the opposite side of the center plane blade. This arrangement in the embodiment of my invention illustrated is repeated throughout the length of the blade and while it will ordinarily be found expedient to employ teeth of all three kinds upon a blade, it will be understood that the particular order or arrangement of the teeth may be varied as desired.

In contrast to the usual form of saw teeth having plane or straight cutting edges, in the present instance the teeth of the saw are provided with arcuate cutting edges as shown more particularly in Fig. 3 in which the line a—b designates the cutting edge of the tooth 11, the line b—c the cutting edge of the tooth 12, and the line c—d the cutting edge of the tooth 13. While the particular curve upon which the edges of the teeth are struck may be varied as desired, as shown herein the cutting edges describe the arcs of circles, and moreover the arcs of all of the teeth 11, 12, and 13 have their centers upon a common line 14 extending longitudinally of the blade in the center plane thereof. With this arrangement, the result is that the bottom of the kerf cut by the blade will have a truly round or circular form in cross section although it is within the spirit of the invention to provide such cutting edges as will give any rounded form which may be desired. It will also be understood that in general it is desirable that cutting edge a—b will extend at least as far transversely of the blade as the adjacent corner of the edge b—c, and these edges may, of course, overlap to some extent if desired. The same is true of the edges b—c and c—d of the teeth 12 and 13 in order that a smooth round bottom kerf will result.

In Fig. 4 of the drawing I have shown a metal block 15 provided with a kerf 16 having a rounded bottom 17 such as would be the result of the action of a saw embodying the present invention as distinguished from the usual saw kerf which would in cross-sectional form be truly rectangular having square bottom corners.

In Fig. 5 of the drawing I have shown a portion of a die block 18 having a die opening 19 of irregular form, having clearance grooves 20 at its lower corners. These grooves may be readily formed by the use of a band saw embodying my improvements as shown in dotted lines at 10. The blade of the saw may be placed at an angle of substantially 45° to the wall of the die opening and the clearance grooves 20 readily formed in the block, these grooves having rounded bottom surfaces which will resist cracking during subsequent heat-treating operations.

While I have shown and described a preferred embodiment of my invention, it will be understood that it is not to be limited to all of the details shown but is capable of modification and variation within the spirit of the invention and within the scope of the appended claims.

What I claim is:

1. A metal cutting saw comprising an elongated blade member having integrally formed teeth projecting therefrom, the width of said teeth being substantially the same as the thickness of the blade, said teeth having cutting edges of arcuate shape and being set upon opposite sides of the center plane of the blade to cut a kerf having a rounded bottom surface.

2. A metal cutting saw comprising an elongated blade member having teeth projecting therefrom, said teeth having cutting edges of arcuate form and the arcs of said edges having their centers upon a common line extending longitudinally of the blade.

3. A metal cutting saw comprising an elongated blade member having teeth projecting therefrom, certain of said teeth being set to one side of the center plane of the blade and others being set to the other side of said plane, said teeth being of the same width as the thickness of the blade and having cutting edges of arcuate form to cut a groove having a rounded bottom surface.

4. A metal cutting saw comprising an elongated blade member having teeth projecting therefrom, certain of said teeth being set to one side of the center plane of the blade and others being set to the other side of said plane, said teeth being of the same width as the thickness of the blade and having cutting edges of arcuate form to cut a groove having a rounded bottom surface, the deepest portion of which is at the center line of the kerf.

5. A metal cutting saw comprising an elongated blade member having a series of integrally formed teeth projecting therefrom and set to one side of the center plane of the blade, and having a second series of teeth set to the other side of the center plane of the blade, the teeth of one series lying between two teeth of the other series, respectively, the cutting edges of said teeth being of arcuate form to cut a kerf having a rounded bottom surface, and the arcs of said edges having their centers on a line extending longitudinally of the blade.

6. A metal cutting saw comprising an elongated blade member having teeth projecting therefrom, certain of said teeth being set to one side of the center plane of the blade and others being set to the other side of said plane, said teeth having cutting edges of arcuate form to cut a groove having a rounded bottom surface and said arcs being struck from a common line extending longitudinally of the blade.

7. A metal cutting saw comprising an elongated blade member having teeth projecting therefrom, said teeth being arranged in a series of groups each of which comprises three teeth, two of said three teeth being set respectively to opposite sides of the center plane of the blade and the third tooth of the group being intermediate the said two teeth and lying substantially in the plane of the blade, all of said teeth having arcuate cutting edges.

8. A metal cutting saw comprising an elongated blade member having teeth projecting therefrom, said teeth being arranged in a series of groups each of which comprises three teeth, two of said three teeth being set respectively to opposite sides of the center plane of the blade and the third tooth of the group being intermediate the said two teeth and lying substantially in the plane of the blade, all of said teeth having arcuate cutting edges and said edges having their centers on a common line extending longitudinally of the blade.

9. A metal cutting saw comprising a blade member having a series of teeth projecting therefrom and set to one side of the center plane of the blade, a second series of teeth set to the other side of the center plane of the blade, and a third series of teeth lying substantially in the plane of the blade, the teeth of each series being interspersed with those of the other series throughout the length of the blade and the cutting edges of said teeth being of arcuate form to cut a kerf having a rounded bottom surface.

GUNNAR OLSON.